(12) United States Patent
Schuerer et al.

(10) Patent No.: US 10,727,510 B2
(45) Date of Patent: Jul. 28, 2020

(54) METHOD OF STARTING-UP A FUEL CELL ARRANGEMENT AND FUEL CELL ARRANGEMENT

(71) Applicant: DIEHL AEROSPACE GMBH, Ueberlingen (DE)

(72) Inventors: Jochen Schuerer, Gau-Bischofsheim (DE); Gunther Kolb, Neustadt/W. (DE)

(73) Assignee: DIEHL AEROSPACE GMBH, Ueberlingen (DE)

(*) Notice: Subject to any disclaimer, the term of this patent is extended or adjusted under 35 U.S.C. 154(b) by 155 days.

(21) Appl. No.: 15/899,641

(22) Filed: Feb. 20, 2018

(65) Prior Publication Data
US 2018/0241057 A1    Aug. 23, 2018

(30) Foreign Application Priority Data

Feb. 20, 2017    (DE) .................. 10 2017 001 564

(51) Int. Cl.
*H01M 8/04223*    (2016.01)
*H01M 8/04302*    (2016.01)
(Continued)

(52) U.S. Cl.
CPC ... *H01M 8/04268* (2013.01); *H01M 8/04014* (2013.01); *H01M 8/04022* (2013.01);
(Continued)

(58) Field of Classification Search
None
See application file for complete search history.

(56) References Cited

U.S. PATENT DOCUMENTS

| 6,086,839 | A | 7/2000 | Autenrieth et al. |
| 6,231,831 | B1 | 5/2001 | Autenrieth et al. |

(Continued)

FOREIGN PATENT DOCUMENTS

| DE | 20320913 U1 | 5/2005 |
| EP | 0 921 585 A2 | 6/1999 |

(Continued)

*Primary Examiner* — Wojciech Haske
(74) *Attorney, Agent, or Firm* — Scully Scott Murphy and Presser

(57) ABSTRACT

The invention relates to a method of starting-up a fuel cell arrangement (1) comprising a fuel processor (2) and a fuel cell (70), wherein the fuel processor (2) comprises the following components: a first evaporator (10), a reformer (20) arranged downstream of the first evaporator (10), a water-gas shift reactor (30), a PrOx reactor (40), a first heat exchanger (11), an afterburner (21) and a startup burner (50), wherein the method comprises the following steps:

Figure 1:
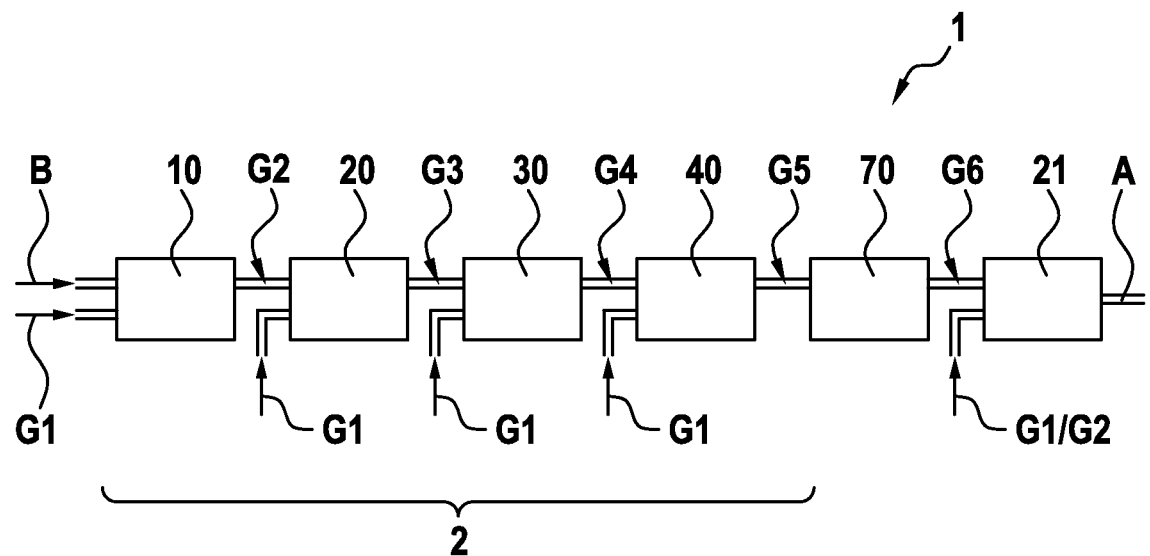

a) electrically heating a heating arrangement in the fuel processor (2) to heat a first gas (G1), b) heating the components of the fuel processor (2) to a fixed operating temperature by circulating the heated first gas (G1) through at least the first heat exchanger (11) and the afterburner (21), c) catalytically combusting an atomized or evaporated fuel (B) in the startup burner (50) and then afterburning hydrogen in the afterburner (21) for further heating of the first gas (G1) via at least one heat exchanger, d) introducing the fuel (B) into the preheated components of the fuel processor (2) and stopping the catalytic combustion in the startup burner (50), e) starting up at least one reaction in the components of the fuel processor (2), until an exit gas from a PrOx reactor (40) has a given CO content, and f) switching on the fuel cell (70).

The invention further relates to a fuel cell arrangement.

17 Claims, 6 Drawing Sheets

(51) Int. Cl.
  *H01M 8/04225* (2016.01)
  *H01M 8/0612* (2016.01)
  *H01M 8/04014* (2016.01)
  *H01M 8/04701* (2016.01)
  *H01M 8/0432* (2016.01)
  *H01M 8/04089* (2016.01)
  *H01M 8/0444* (2016.01)
  *H01M 8/04791* (2016.01)
  *H01M 8/04007* (2016.01)

(52) U.S. Cl.
  CPC ..... *H01M 8/04037* (2013.01); *H01M 8/0444* (2013.01); *H01M 8/04089* (2013.01); *H01M 8/04225* (2016.02); *H01M 8/04302* (2016.02); *H01M 8/04373* (2013.01); *H01M 8/04738* (2013.01); *H01M 8/04791* (2013.01); *H01M 8/0612* (2013.01); *H01M 8/0618* (2013.01); *Y02P 20/129* (2015.11)

(56) References Cited

U.S. PATENT DOCUMENTS

| | | | |
|---|---|---|---|
| 6,846,585 B2 * | 1/2005 | Robb | B01J 19/0013 429/412 |
| 2003/0093950 A1 | 5/2003 | Goebel et al. | |
| 2004/0197617 A1 | 10/2004 | Kaupert et al. | |

FOREIGN PATENT DOCUMENTS

| | | |
|---|---|---|
| EP | 0 924 161 A2 | 6/1999 |
| EP | 1 465 274 A2 | 10/2004 |
| EP | 1703578 A1 | 9/2006 |

* cited by examiner

METHOD OF STARTING-UP A FUEL CELL ARRANGEMENT AND FUEL CELL ARRANGEMENT

The invention relates to a method of starting-up a fuel cell arrangement and to a fuel cell arrangement.

A method of starting-up a fuel cell arrangement and a fuel cell arrangement are known, for example, from DE 203 20 913 U1. The known fuel cell arrangement comprises a fuel reservoir, a heating unit and a fuel cell device. The heating unit is a heating unit which is executed separately from the fuel cell device and can be utilized exclusively for startup of the fuel cell device, by generating heating water and/or hot air. The fuel cell arrangement can be operated with a primary fuel composed of butane or propane, which are typically also available for gas burners. In addition, the fuel cell arrangement may comprise a latent heat storage means for preheating the fuel cell after a restart. In this case, firstly a reformer is heated, and subsequently the fuel cell by means of a gas heated in the reformer.

As an alternative, DE 203 20 913 also discloses a heating unit which is operated with electrical power. In addition, the publication envisages further heat sources, especially electrical heat sources, for heating of a reformer and the fuel cell. The system proposed is cumbersome and requires a large amount of space. Moreover, it is unsuitable for fuel cells which are operated with propylene glycol.

EP 1 703 578 A1 discloses a reformer/fuel cell system having an external burner and a method of starting-up the reformer/fuel cell system. Startup of the reformer/fuel cell system requires a burner arranged outside the system for generation of hot offgas. The offgas thus generated is guided through part of the reformer/fuel cell system in order to heat the components of the reformer/fuel cell system to a given temperature. The provision of a burner used exclusively for startup of the system means that the system requires the additional burner and has an increased volume as a result. In addition, after the startup phase has ended, backflow of process gas into the startup burner has to be prevented, and so an additional valve is required. Furthermore, soot particles frequently form in such a burner, which can be deposited in the downstream reformer system. The covering of a catalytic coating with soot particles reduces the efficacy and lifetime of a catalyst coating and reduces possible heat transfer in heat exchangers. This considerably increases the requirement for maintenance in such a system.

The problem addressed by the invention is that of eliminating the disadvantages according to the prior art. More particularly, an efficient method of starting-up a fuel cell arrangement is to be specified, the components of which can also be utilized in sustained operation of the fuel cell arrangement.

The problem addressed by the invention is solved by the features of claims 1 and 9. Appropriate configurations of the invention will be apparent from the dependent claims.

According to the invention, a method of starting-up a fuel cell arrangement comprising a fuel processor and a fuel cell is specified, wherein the fuel processor comprises the following components: an evaporator, a reformer arranged downstream of the evaporator, a water-gas shift reactor, a PrOx reactor, a first heat exchanger and a startup burner, wherein the method comprises the following steps:
a) electrically heating a heating arrangement in the fuel processor to heat a first gas,
b) heating the components of the fuel processor to a fixed operating temperature by circulating the heated first gas through at least the afterburner and the first heat exchanger,
c) catalytically combusting an atomized or evaporated fuel in the startup burner and then afterburning hydrogen in the afterburner for further heating of the first gas via at least one heat exchanger,
d) introducing the fuel into the preheated components of the fuel processor and stopping the catalytic combustion in the startup burner,
e) starting up at least one reaction in the components of the fuel processor, until an exit gas from a PrOx reactor has a given CO content, and
f) switching on the fuel cell.

A "fuel processor" is understood to mean an arrangement of series-connected reactors in which a fuel is converted by means of one or more reactions such that a hydrogen-containing gas is generated, which can be introduced into the fuel cell. In the reactions, it is especially necessary to reduce a CO content to a given content. A suitable fuel is especially propylene glycol. The first gas contains oxygen. The fuel processor comprises an evaporator in which the fuel is evaporated. Preferably, a propylene glycol/water mixture is evaporated in the evaporator. "Evaporated" here also means the generation of superheated steam.

One fuel processor component is the reformer. In the reformer, the evaporated fuel, the second gas, is reformed with addition of the first gas, so as to generate a hydrogen-containing third gas. The third gas especially contains proportions of carbon monoxide, carbon dioxide, water and nitrogen. The reformer exchanges heat with the afterburner, and so the afterburner can be used as heater for the reformer.

A further fuel processor component is what is called the water-gas shift reactor. The third gas is converted in the water-gas shift reactor with addition of the first gas to a fourth gas containing a lower proportion of carbon monoxide. The fourth gas, with addition of further first gas, is introduced into what is called the PrOx reactor, a further fuel processor component, where it is converted to a fifth gas. In the PrOx reactor, the content of carbon monoxide is reduced further, especially by a preferred oxidation of the carbon monoxide. The fifth gas generated in the PrOx reactor can then be introduced into the fuel cell. The fifth gas contains hydrogen, from which electrical energy and water are obtained with an oxidizing agent in the fuel cell.

In addition, the fuel processor comprises at least the first heat exchanger which is arranged such that the evaporator can be heated therewith. In addition, the fuel processor comprises the startup burner which can be operated with the fuel. In steps a) and b), the fuel processor components are heated by circulating the heated first gas, by heating of the first heat exchanger by first gas flowing into the evaporator and then circulation of this first gas through the fuel processor components of reformer, water-gas shift reactor and PrOx reactor. Heated first gas flowing through the afterburner heats the reformer. The method utilizes exclusively components which can also be used in sustained operation of the fuel cell arrangement. The method does not generate any extraneous substances, especially any soot, which restrict the operation of the fuel cell arrangement.

Preferably, the method further comprises the step of introducing a fuel downstream of the startup burner and afterburning the hydrogen and the fuel introduced in the afterburner. The supply of further fuel to the afterburner increases the temperature of the gas guided through the first heat exchanger and increases the heating of the reformer.

In a further configuration, the method further comprises, in step c): using a first heat exchanger having a catalytic coating and introducing a fuel downstream of the afterburner and catalytically combusting the fuel in the catalytically coated first heat exchanger. The catalytic combustion in the first heat exchanger generates further heat which can be utilized directly in this case for heating of the evaporator. This brings the first gas flowing through the evaporator to an elevated temperature.

Appropriately, the fuel used is a propylene glycol/water mixture. The first gas used is preferably air.

Appropriately, the fuel processor comprises a second heat exchanger which heats the first gas upstream of the startup burner and cools a gas downstream of the reformer and upstream of the water-gas shift reactor. The first gas may thus already be preheated upstream of the startup burner, especially starting from step d); at the same time, it is possible to establish a defined temperature profile between the individual fuel processor components.

In a particularly preferred configuration, in the startup burner, optionally, a heating arrangement is electrically heated or a fuel is catalytically combusted. The provision of a heating arrangement and a unit for catalytic combustion in the startup burner again increases the degree of integration of the fuel cell arrangement since it is possible in this way to avoid a further separate unit.

In an appropriate configuration, the startup burner can also be switched on during the operation of the fuel cell. If a first gas continues to flow through the startup burner, unwanted backflow, especially of hydrogen, can be avoided without the provision of a further component.

The invention additionally relates to a fuel cell arrangement having a fuel processor and a fuel cell, comprising:
an evaporator,
a PrOx reactor and
a first heat exchanger,
wherein the fuel processor comprises a startup burner and a downstream afterburner arranged downstream of the PrOx reactor and upstream of the first heat exchanger,
wherein the first heat exchanger has heat-transferring connection to the evaporator. It is thus possible to use heat that has arisen for evaporation of the fuel. More particularly, the heat that has arisen is used where it is required. The efficiency of the fuel cell arrangement is thus increased.

"Heat-transferring connection" in the context of the invention is understood to mean that heat exchange takes place between the elements having heat-transferring connection. Appropriately, two elements having heat-transferring connection are arranged in a common housing or are stacked one on top of the other, or one of the elements is integrated into the other.

Preferably, the startup burner comprises a heating arrangement for heating of a first gas and a unit for catalytic combustion of a fuel. The heating arrangement may comprise a heat storage means and/or an electrical heating element. The startup burner is thus suitable both for generating a low temperature for a first startup phase and for generating a higher temperature for a second startup phase. The startup burner of such a design can additionally also be used during the operation of the fuel cell for regulation of the temperature of the fuel cell arrangement or for regulation of the offgas coming from the fuel cell.

The fuel cell arrangement according to the invention allows a high degree of integration. Waste heat can be exploited in an optimized manner. The fuel cell arrangement can be operated in a soot-free manner. This considerably reduces the level of maintenance work for the fuel cell arrangement.

In an advantageous configuration, the startup burner has at least one first and one second chamber, the first chamber having a catalyst coating for catalytic combustion and the second chamber being designed for gas preheating. The first chamber may be arranged within the second chamber. The catalyst coating is suitable for combustion of an atomized or evaporated propylene glycol/water mixture. It is preferably also suitable for combustion of hydrogen. This feature ensures that no uncombusted hydrogen can escape from the fuel cell arrangement through the startup burner if there is insufficient negative pressure.

Preferably, a unit for atomization or evaporation of the fuel is connected upstream of the first chamber of the startup burner. The unit for atomization or evaporation may be part of the startup burner.

Appropriately, the first heat exchanger comprises a unit for catalytic combustion of a fuel. This unit may especially comprise catalytic coating of internal surfaces and/or plates arranged within the first heat exchanger, and catalytic combustion of the fuel on this catalytic coating.

In a further appropriate configuration, the afterburner has heat-transferring connection to the reformer. Thus, the reformer can be heated by the afterburner.

"Heat-transferring connection" in the context of the invention is understood to mean that heat exchange takes place between the elements with heat-transferring connection. Appropriately, two elements with heat-transferring connection are arranged in a common housing or stacked on top of one another, or one of the elements is integrated into the other.

In a further configuration, the PrOx reactor has heat-transferring connection to a second evaporator and the second evaporator is designed for evaporation of a fuel, wherein the evaporated fuel can be introduced upstream of the reformer. In the PrOx reactor, heat is generated by the PrOx reaction, a preferred oxidation reaction. The heat generated thereby can be utilized for further evaporation of the fuel. This further enhances the efficiency of the fuel cell arrangement.

Appropriately, a second heat exchanger is arranged upstream of the startup burner and the second heat exchanger is a countercurrent heat exchanger designed for cooling of a gas downstream of the reformer and upstream of the water-gas shift reactor. The second heat exchanger can simultaneously cool a gas leaving the reformer, the third gas, prior to entry into the water-gas shift reactor and simultaneously preheat a first gas, especially air, which is to be introduced into the startup burner.

In a further configuration, the water-gas shift reactor is connected to a third heat exchanger designed for preheating of the first gas, with provision of a feed conduit for the heated first gas between startup burner and afterburner. This third heat exchanger thus serves to cool the water-gas shift reactor and simultaneously to heat a first gas to be introduced into the afterburner.

Appropriately, there is a three-way valve arranged downstream of the PrOx reactor, by means of which an offgas from the PrOx reactor can be guided either upstream of the startup burner, downstream of the startup burner through a bypass of the fuel cell, or downstream of the startup burner through the fuel cell.

A three-way valve of this kind enables switching back and forth between different states of operation of the fuel cell arrangement. This valve increases the degree of integration of the fuel cell arrangement. When the offgas from the PrOx reactor is introduced upstream of the startup burner, the fuel processor components can first be heated up to a first operating temperature, such that the reactions in the fuel processor components can be started up. By virtue of the guiding through a bypass, it is possible to adjust the reactions in the fuel processor components such that the offgas from the PrOx reactor has the composition necessary for introduction into the fuel cell. Switching on the fuel cell starts the operation of the fuel cell.

In a further configuration, the startup burner is arranged inline between the second heat exchanger and the afterburner. The startup burner is thus completely integrated into the arrangement of the fuel cell arrangement.

Figure 2:
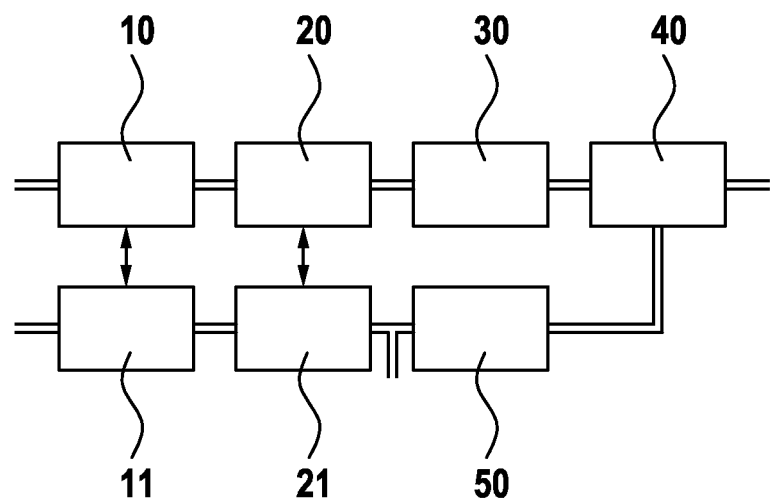
Figure 3:
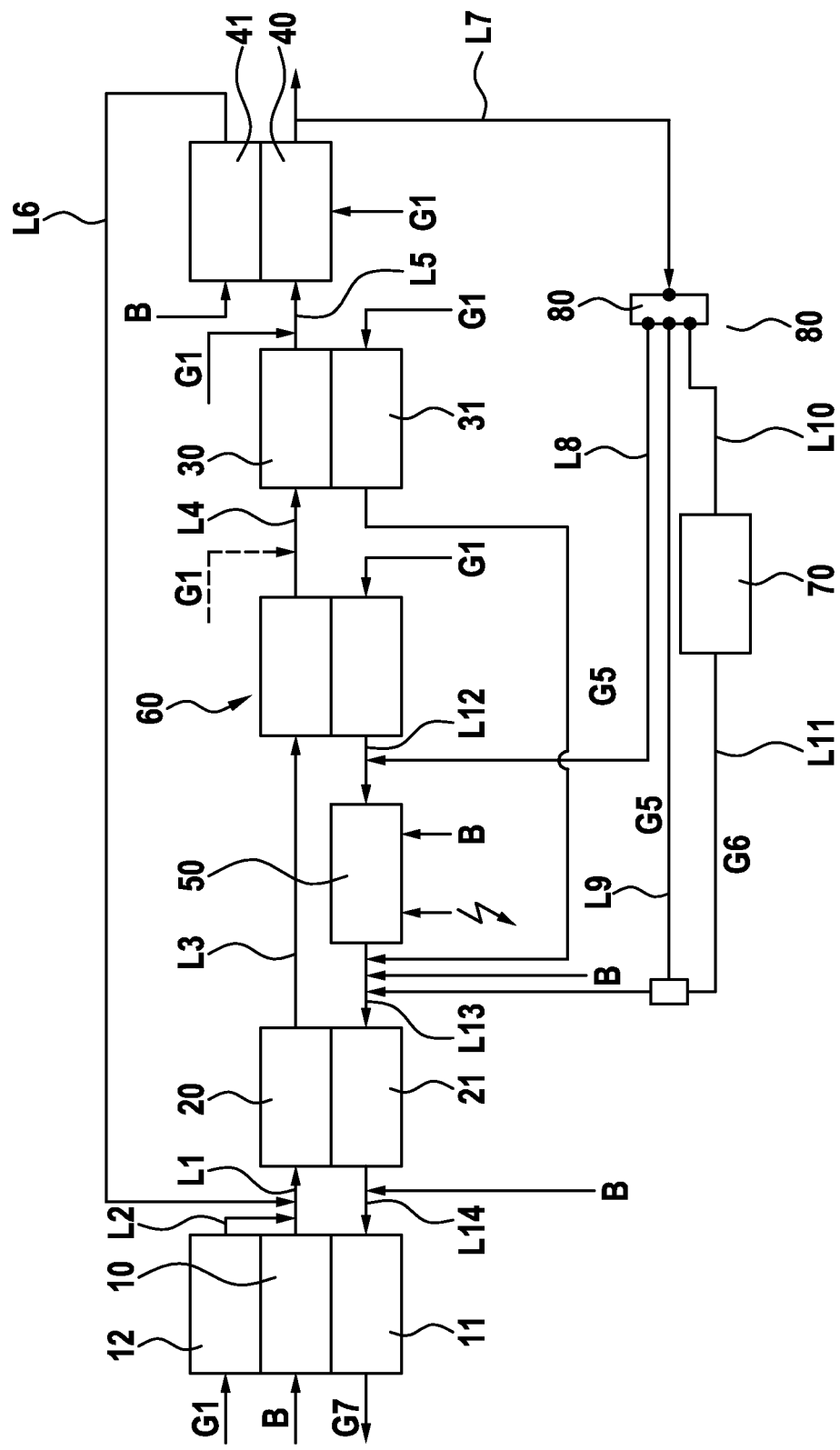
Figure 4:
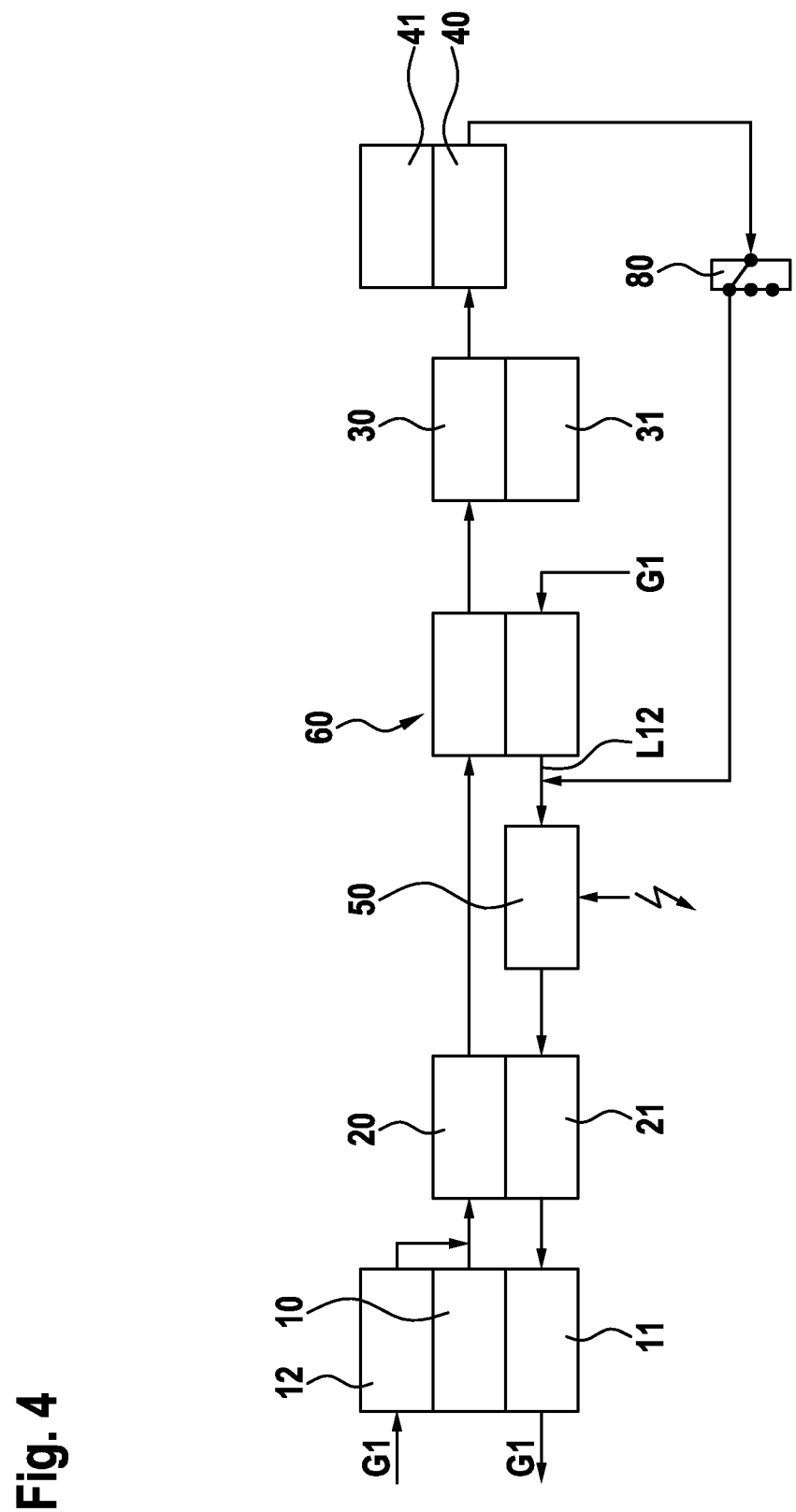
Figure 5:
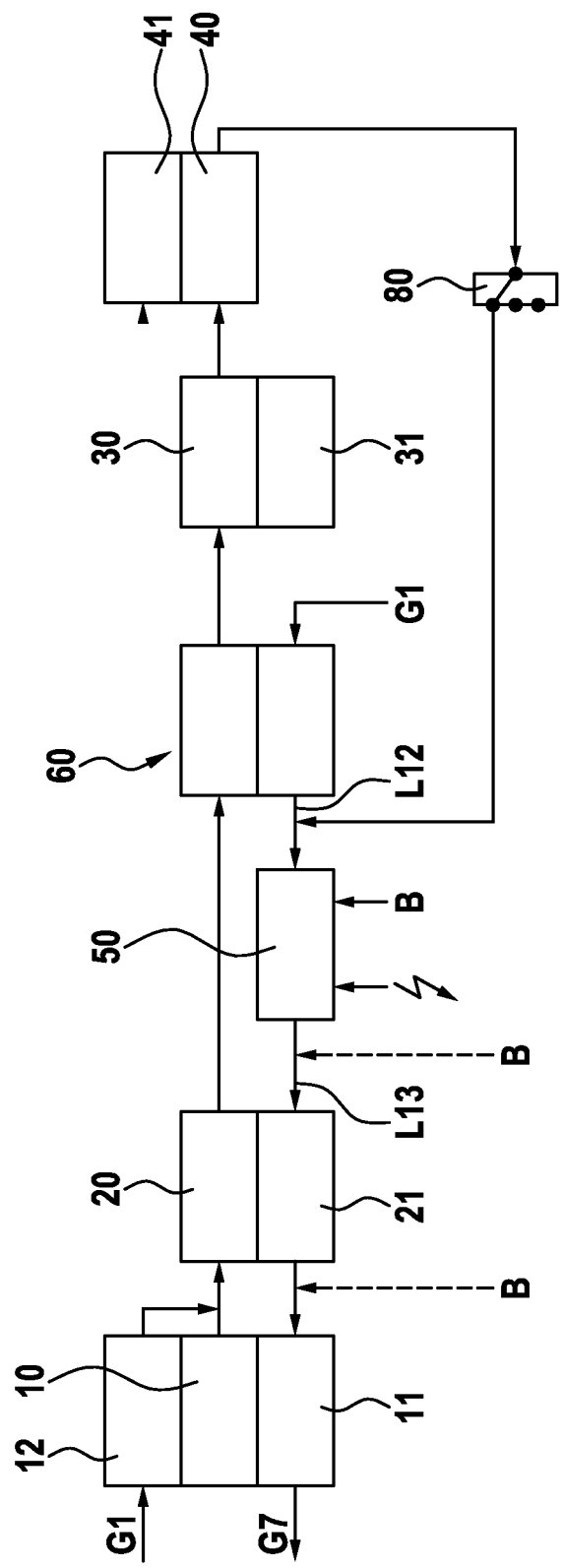
Figure 6:
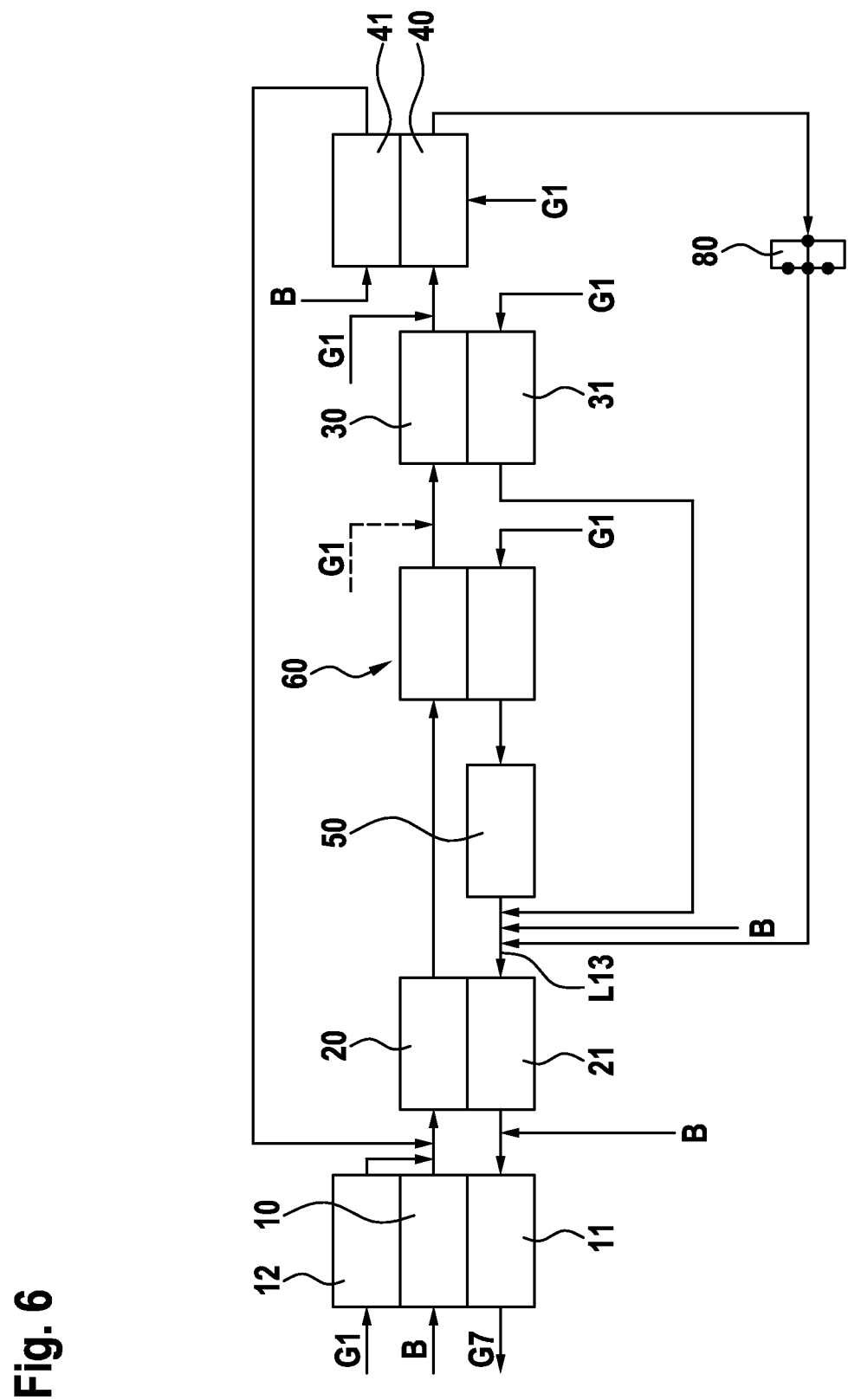
Figure 7:
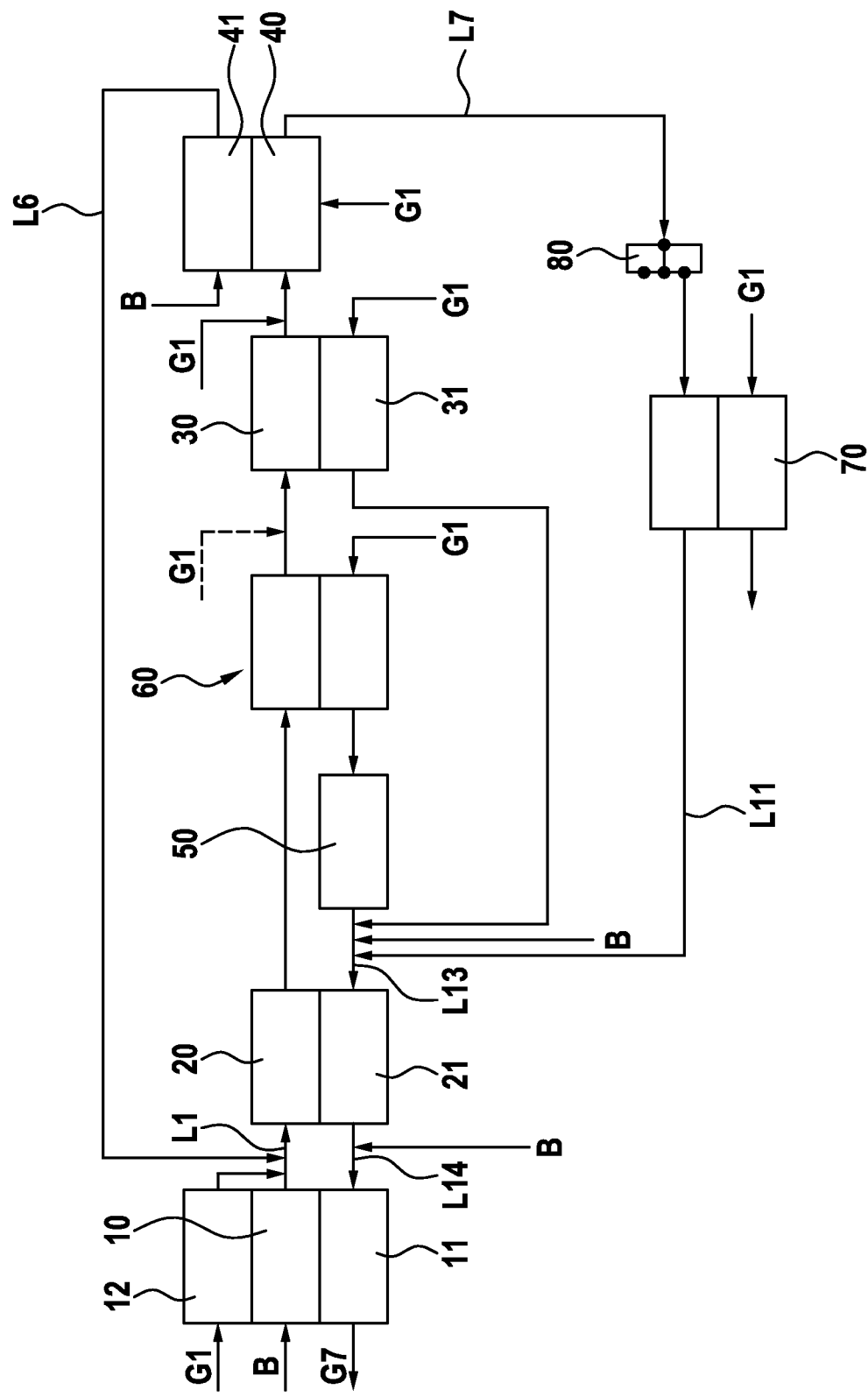

The invention is elucidated in detail hereinafter with reference to drawings. The drawings are schematic diagrams. The figures show:

FIG. 1 the construction of a fuel cell arrangement according to the invention with a fuel processor, FIG. 2 a schematic diagram of a fuel processor, FIG. 3 a block flow diagram of a fuel cell arrangement with a fuel processor, FIG. 4 a block flow diagram of the fuel processor during a first phase of the startup method, FIG. 5 a block flow diagram in the case of catalytic combustion in the startup burner, FIG. 6 a block flow diagram in the case of partial load reforming, and FIG. 7 a block flow diagram in the case of fuel cell operation.

FIG. 1 shows the essential components of a fuel cell arrangement 1 comprising a fuel processor 2 and a fuel cell 70. The fuel processor 2 comprises the following fuel processor components: a first evaporator 10, a reformer 20, a water-gas shift reactor 30 and a PrOx reactor 40. A fuel B is evaporated by means of the first evaporator 10. The second gas exiting from the first evaporator 10 is identified by the reference numeral G2. The second gas G2 is introduced together with a first gas G1 into the reformer 20 in which it is converted to a third gas G3. With addition of a first gas G1, the third gas G3 can be introduced into the water-gas shift reactor 30, in which it is converted to a fourth gas G4. With addition of the first gas G1, the fourth gas G4 is introduced into the PrOx reactor 40. The offgas from the PrOx reactor 40 forms a fifth gas G5 which can be introduced into the fuel cell 70. The offgas formed in the fuel cell 70 is a sixth gas G6 which is combusted in an afterburner 21 with addition of the first gas G1 and/or the second gas G2. For startup of the fuel cell arrangement 1 shown, a startup burner 50 is required.

FIG. 2 shows the fuel processor 2, which comprises the first evaporator 10, the reformer 20, the water-gas shift reactor 30, the PrOx reactor 40, the startup burner 50, the afterburner 21 and a first heat exchanger 11. The fuel processor components are in fluid connection to one another in the aforementioned sequence. Each of these fuel processor components has a housing, an inlet and an outlet. More particularly, each of the components additionally has a second inlet. The first evaporator 10 and the first heat exchanger 11 are arranged such that the first evaporator 10 can be heated by the first heat exchanger 11. The reformer 20 and the afterburner 21 are connected to one another such that the reformer 20 can be heated by the afterburner 21. Offgas from the first heat exchanger 11 is conducted out of the fuel cell arrangement 1. The PrOx reactor 40 comprises a second exit for releasing a gas to the fuel cell 70 or a conduit connected between the PrOx reactor 40 and the startup burner 50 and having a conduit branch, especially having a valve. A further inlet is provided between the startup burner 50 and the afterburner 21, via which the PrOx reactor 40 can be connected or hydrogen can be introduced.

FIG. 3 shows, in schematic form, a working example of the fuel cell arrangement 1. The first evaporator 10 has heat-transferring coupling to the first heat exchanger 11. Optionally, in addition, a fourth heat exchanger 12 may have heat-transferring coupling to the first evaporator 10. The fuel B is introduced into the first evaporator 10. The exit from the first evaporator 10 has fluid connection via a first conduit L1 to the reformer 20. Through a second conduit L2 which opens into the first conduit L1, the first gas G1 is introduced into the first conduit L1. The second conduit L2 is connected to the fourth heat exchanger 12. Third gas G3 generated in the reformer 20 is guided through a third conduit L3 to a second heat exchanger 60 and subsequently, downstream of the second heat exchanger 60, through a fourth conduit L4 into the water-gas shift reactor 30. A conduit for supplying first gas G1 may open into the fourth conduit L4. The fourth gas G4 generated in the water-gas shift reactor 30 is guided through a fifth conduit L5 into the PrOx reactor 40. A feed for first gas G1 may open into the fifth conduit L5. The water-gas shift reactor 30 has heat-transferring connection to a third heat exchanger 31.

The PrOx reactor 40 has a further inlet for introduction of first gas G1. In the configuration shown, the PrOx reactor 40 has heat-transferring connection to a second evaporator 41. In this way, it is possible for the heat generated in the PrOx reactor 40 to be removed. The second evaporator 41 comprises a feed for introduction of the fuel B and an outlet which opens via a sixth conduit L6 into the first conduit L1. The first evaporator 10 and the second evaporator 41 may alternatively or additionally take the form of a superheater.

Offgas generated in the PrOx reactor 40, the fifth gas G5, is guided via a seventh conduit L7 to a three-way valve 80. Three conduits branch off from the three-way valve 80: an eighth conduit L8 leads from the three-way valve 80 to a feed to the startup burner 50, which is identified as the twelfth conduit with the reference numeral L12, a ninth conduit L9 opens into a feed to the afterburner 21, which is the thirteenth conduit L13, and a tenth conduit L10 leads from the three-way valve 80 to the fuel cell 70. Offgas from the fuel cell 70 is guided via an eleventh conduit L11 to the thirteenth conduit L13. The ninth conduit L9 and the eleventh conduit L11 may merge with one another, such that just one of the two conduits L9, L11 opens into the thirteenth conduit L13.

The twelfth conduit L12 introduces either fifth gas G5 or first gas G1 into the startup burner 50, which is combusted or heated therein. Offgas from the startup burner 50 and/or the air heated in the startup burner 50 is fed via the thirteenth conduit L13 to the afterburner 21. The offgas from the afterburner 21 is guided via a fourteenth conduit L14, optionally with addition of further fuel B, into the first heat exchanger 11 and leaves the heat exchanger 11 as seventh gas G7.

The first heat exchanger 11 has a unit for catalytic combustion of the fuel B. The unit for catalytic combustion in the first heat exchanger 11 takes the form of a catalytic coating of plates arranged in the first heat exchanger 11.

The startup burner 50 comprises a heating arrangement which can be electrically heated, and a unit for catalytic combustion of a fuel B. The startup burner 50 preferably comprises a nozzle, not shown in FIG. 3, for atomization or evaporation of the fuel B, such that the combustion can be effected with higher efficiency. Alternatively, the startup burner 50 may comprise a further evaporator for evaporation of fuel. Upstream of the twelfth conduit L12, first gas G1 can be guided in countercurrent through the second heat exchanger 60, such that already heated first gas G1 can be guided into the startup burner 50.

FIG. 4 shows the fuel processor components of the fuel cell arrangement 1 that are required for a first startup phase, and the corresponding conduction of gas in a block flow diagram. In a first startup phase for heating of the fuel processor components, exclusively first gas G1 is guided through the fuel processor components. The first gas G1 is introduced through the first evaporator 10 or appropriately through the fourth heat exchanger 12 having thermal connection to the first evaporator 10. The first gas G1 passes successively through the reformer 20, the optionally present second heat exchanger 60, the water-gas shift reactor 30 and the PrOx reactor 40, and is guided from the PrOx reactor 40 into the startup burner 50. The startup burner 50 has a heating arrangement and uses it to heat the first gas G1. The first gas G1 heated in the startup burner 50 flows through the afterburner 21 and the first heat exchanger 11. The first heat exchanger 11 transfers the heat to the first evaporator 10 and any fourth heat exchanger 12 present. The afterburner 21 heats the reformer 20.

When a second heat exchanger 60 is present, further first gas G1 can be introduced into the second heat exchanger 60 upstream of the twelfth conduit 12. The components of the fuel processor 2 are brought to a first temperature T1 by this process step.

The second startup phase is shown in the block diagram in FIG. 5. The startup burner 50 is heated to a second temperature T2 by catalytic combustion of a fuel B. First gas G1 passes through the first evaporator 10 or the fourth heat exchanger 12. The air heated therein flows successively through the reformer 20, optionally the second heat exchanger 60, the water-gas shift reactor 30 and the PrOx reactor 40, and is introduced into the twelfth conduit L12 upstream of the startup burner 50. Atomized or evaporated fuel B is then catalytically combusted in the startup burner 50. It is optionally possible to additionally electrically heat the heating arrangement. Offgas from the startup burner 50 is guided via the thirteenth conduit L13 to the afterburner 21. Optionally, further fuel B can be introduced into the thirteenth conduit L13. The offgas from the startup burner 50 and any fuel B introduced are combusted in the afterburner 21. If, as shown in FIG. 5, the afterburner 21 has heat-transferring connection to the reformer 20, the waste heat from the afterburner 21 can be utilized for further heating of the reformer 20. Offgas from the afterburner 21 is guided via the fourteenth conduit L14 to the first heat exchanger 11. In a first heat exchanger 11 with a unit for catalytic combustion, fuel B can additionally be introduced into the fourteenth conduit L14, such that further catalytic combustion of the fuel B is conducted in the first heat exchanger 11. The gas that has left the first heat exchanger is the seventh gas G7. The waste heat generated is also utilized for heating of the first evaporator 10 and optionally of the fourth heat exchanger 12.

FIG. 6 shows a block diagram of what is called partial load reforming, which follows the second startup phase, during which the fuel cell has not yet been switched on. In this process step, the fuel B is additionally introduced into the first evaporator 10. In addition, fuel B can also be introduced into the second evaporator 41. In this process step, the reactions envisaged are conducted in the individual components of the fuel processor 2, namely reformer 20, water-gas shift reactor 30 and PrOx reactor 40. Offgas from the PrOx reactor 40, the fifth gas G5, in this phase of the process is introduced into the thirteenth conduit L13 downstream of the startup burner 50 and upstream of the afterburner 21. The startup burner 50 and any upstream second heat exchanger 60, in this process step, serve for supply of the heated first gas G1. The startup burner 50 can optionally heat the first gas G1 further by electrical heating of the heating arrangement.

Performance of the reaction in the PrOx reactor 40 is accomplished by introduction either through supply of the first gas G1 into the fifth conduit L5 or through supply of the first gas G1 through a further inlet into the PrOx reactor 40.

To end the startup method or for complete operation of the fuel cell arrangement 1, the fuel cell 70 is coupled to the fuel processor 2. This means that the offgas from the PrOx reactor 40 is introduced into the fuel cell 70. This is shown in FIG. 7. The offgas from the fuel cell 70, especially an anode offgas from the fuel cell 70, is recycled back into the fuel processor 2 downstream of the startup burner 50 and upstream of the afterburner 21. The further reactions in the fuel processor 2 continue to proceed in the reformer 20, water-gas shift reactor 30 and the PrOx reactor 40. The fuel cell offgas, optionally with addition of the fuel B, is subjected to afterburning in the afterburner 21 or to catalytic combustion in the first heat exchanger 11 with addition of further fuel B. The seventh gas G7 is removed from the heat exchanger 11. In this process step too, optionally preheated first gas G1 still flows through the startup burner 50.

LIST OF REFERENCE NUMERALS 1 fuel cell arrangement
2 fuel processor
10 first evaporator
11 first heat exchanger
12 fourth heat exchanger
20 reformer
21 afterburner
30 water-gas shift reactor
31 third heat exchanger
40 PrOx reactor
41 second evaporator
50 startup burner
60 second heat exchanger
70 fuel cell
80 three-way valve
B fuel
G1 first gas
G2 second gas
G3 third gas
G4 fourth gas
G5 fifth gas
G6 sixth gas
G7 seventh gas
L1 first conduit
L2 second conduit
L3 third conduit
L4 fourth conduit
L5 fifth conduit
L6 sixth conduit
L7 seventh conduit
L8 eighth conduit
L9 ninth conduit
L10 tenth conduit
L11 eleventh conduit
L12 twelfth conduit
L13 thirteenth conduit
L14 fourteenth conduit
T1 first temperature
T2 second temperature

The invention claimed is:

1. A method of starting-up a fuel cell arrangement comprising a fuel processor and a fuel cell,
wherein the fuel processor comprises the following components: a first evaporator, a reformer arranged downstream of the first evaporator, a water-gas shift reactor, a PrOx reactor, a first heat exchanger, an afterburner and a startup burner,
wherein the method comprises the following steps:
a) electrically heating a heating arrangement in the fuel processor to heat a first gas (G1),
b) heating the components of the fuel processor to a fixed operating temperature by circulating the heated first gas (G1) through at least the first heat exchanger and the afterburner,
c) catalytically combusting an atomized or evaporated fuel (B) in the startup burner and then afterburning hydrogen in the afterburner for further heating of the first gas (G1) via at least one heat exchanger,
d) introducing the fuel (B) into the preheated components of the fuel processor and stopping the catalytic combustion in the startup burner,
e) starting up at least one reaction in the components of the fuel processor, until an exit gas from a PrOx reactor has a given CO content, and
f) switching on the fuel cell.

2. The method according to claim 1, wherein step c) comprises:
introducing a fuel (B) downstream of the startup burner and afterburning the hydrogen and the fuel (B) introduced in an afterburner.

3. The method according to claim 1, wherein step c) comprises:
using a first heat exchanger having a catalytic coating and introducing a fuel (B) downstream of the afterburner and catalytically combusting the fuel (B) in the catalytically coated first heat exchanger.

4. The method according to claim 1, wherein the fuel (B) used is a propylene glycol/water mixture.

5. The method according to claim 1, wherein the first gas (G1) used is air.

6. The method according to claim 1, wherein the fuel processor comprises a second heat exchanger which heats the first gas (G1) upstream of the startup burner and cools first gas (G1) or a third gas (G3) downstream of the reformer and upstream of the water-gas shift reactor.

7. The method according to claim 1, wherein, in the startup burner, a heating arrangement is electrically heated and/or a fuel (B) is catalytically combusted.

8. The method according to claim 1, wherein the startup burner is switched on during the operation of the fuel cell.

9. A fuel cell arrangement having a fuel processor and a fuel cell, comprising:
a first evaporator),
a reformer arranged downstream of the first evaporator,
a water-gas shift reactor,
a PrOx reactor and a first heat exchanger,
wherein the fuel processor comprises a startup burner and a downstream afterburner, both of which are arranged downstream of the PrOx reactor and upstream of the first heat exchanger.

10. The fuel cell arrangement according to claim 9, wherein the startup burner comprises a unit for electrical heating of a first gas (G1) and a unit for catalytic combustion of a fuel (B).

11. The fuel cell arrangement according to claim 9, wherein the first heat exchanger comprises a unit for catalytic combustion of a fuel (B).

12. The fuel cell arrangement according to claim 9, wherein the afterburner has heat-transferring connection to the reformer.

13. The fuel cell arrangement according to claim 9, wherein the PrOx reactor has heat-transferring connection to a second evaporator and the second evaporator is designed for evaporation of the fuel (B), wherein the evaporated fuel (B) can be introduced upstream of the reformer.

14. The fuel cell arrangement according to claim 9, wherein a second heat exchanger is arranged upstream of the startup burner and the second heat exchanger is a countercurrent heat exchanger which is designed to cool a gas downstream of the reformer and upstream of the water-gas shift reactor.

15. The fuel cell arrangement according to claim 9, wherein the water-gas shift reactor is connected to a third heat exchanger designed to preheat the first gas (G1), wherein a feed conduit for the heated first gas (G1) is arranged between the startup burner and afterburner.

16. The fuel cell arrangement according to claim 9, wherein there is a three-way valve arranged downstream of the PrOx reactor, by means of which an offgas from the PrOx reactor can be guided either upstream of the startup burner, downstream of the startup burner through a bypass of the fuel cell, or downstream of the startup burner through the fuel cell.

17. The fuel cell arrangement according to claim 9, wherein the startup burner is arranged inline between the second heat exchanger and the afterburner.

* * * * *